(12) United States Patent
Libecco

(10) Patent No.: US 6,389,655 B2
(45) Date of Patent: May 21, 2002

(54) ADJUSTABLE ELASTIC TIE-DOWN CORD

(76) Inventor: Denis E. Libecco, 115 Rocks Rd., Parker, PA (US) 16049

( * ) Notice: Subject to any disclaimer, the term of this patent is extended or adjusted under 35 U.S.C. 154(b) by 0 days.

(21) Appl. No.: 09/753,702

(22) Filed: Jan. 3, 2001

Related U.S. Application Data

(63) Continuation-in-part of application No. 09/328,326, filed on Jun. 9, 1999, now abandoned.

(51) Int. Cl.[7] ............................................. F16G 11/00
(52) U.S. Cl. ...................................... 24/300; 24/129 R
(58) Field of Search ........................... 410/96, 97, 100; 24/129 D, 129 A, 129 B, 129 R, 115 H, 298, 300–302; 248/499

(56) References Cited

U.S. PATENT DOCUMENTS

| | | | | | |
|---|---|---|---|---|---|
| 477,522 | A | * | 6/1892 | Drayton | 24/131 C |
| 496,696 | A | * | 5/1893 | Nash | 211/1 |
| 790,929 | A | * | 5/1905 | Smith | 223/103 |
| 1,321,660 | A | * | 11/1919 | Moriarty | 24/129 A |
| 1,368,667 | A | * | 2/1921 | Thorson | 24/129 R |
| 1,652,351 | A | * | 12/1927 | Dyer | 24/129 R |
| 2,316,950 | A | * | 4/1943 | Goeller | 211/119.15 |
| 2,538,021 | A | * | 1/1951 | Lushbaugh | 135/120.2 |
| 3,094,755 | A | * | 6/1963 | Casanave | 114/230.2 |
| 3,328,064 | A | * | 6/1967 | Simon | 24/129 B |
| 3,930,288 | A | * | 1/1976 | Black et al. | 24/129 R |
| 4,220,306 | A | * | 9/1980 | Cueto et al. | 24/129 R |
| 4,286,762 | A | * | 9/1981 | Prouty | 24/129 R |
| 4,953,903 | A | * | 9/1990 | Warner | 24/68 D |
| 5,351,367 | A | * | 10/1994 | Kennedy et al. | 24/129 R |
| 6,279,205 | B1 | * | 8/2001 | Steiner | 24/130 |
| 6,317,935 | B1 | * | 11/2001 | O'Rouke | 24/115 K |

* cited by examiner

*Primary Examiner*—James R. Brittain
(74) *Attorney, Agent, or Firm*—Carothers & Carothers

(57) ABSTRACT

An adjustable elastic tie-down cord having an elongated stretchable elastic cord with a hook secured to one end. A line adjusting retainer bar is provided with two spaced through passages in which the cord is slidably received whereby an adjustable loop in the cord is formed on one side of the bar for selectively adjusting the overall length of the cord. The other cord end is provided with a stop knot so that it will not slip through its adjacent passage in the line adjusting retainer bar and a hook is slidably received on the cord in the loop section. The passage through which the cord is slidably received for adjustment is provided with protrusions at appropriate positions to engage the stretch cord thereby penetrate the elastic cord for assisting and locking it in position within the passage.

7 Claims, 3 Drawing Sheets

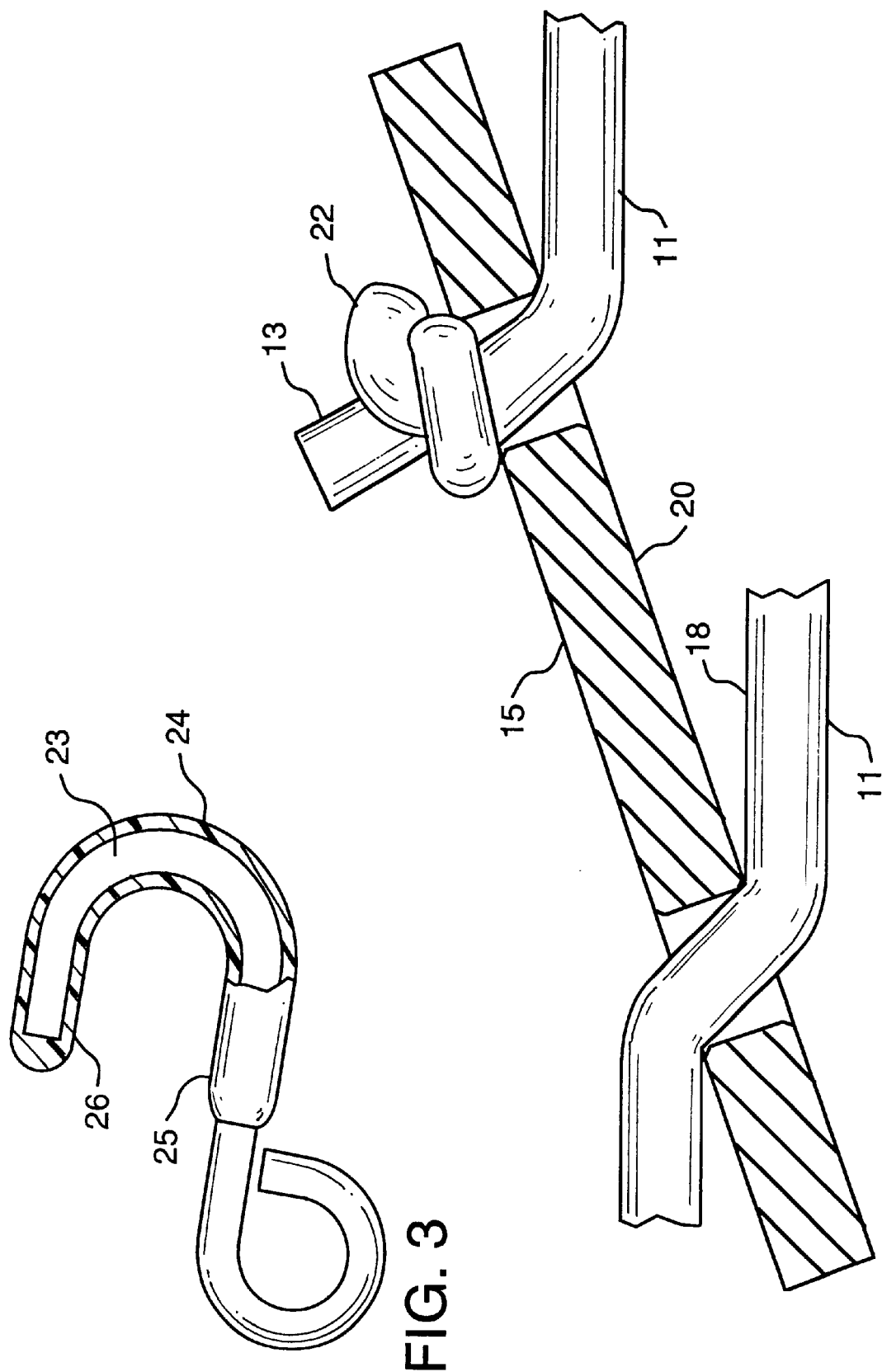

ADJUSTABLE ELASTIC TIE-DOWN CORD

CROSS REFERENCE

This application is a continuation-in-part of U.S. patent application Ser. No. 09/328,326, filed on Jun. 9, 1999 for ADJUSTABLE ELASTIC TIE-DOWN CORD, now abandoned.

BACKGROUND OF THE INVENTION

This invention relates to an adjustable tension fastener and more particularly to an adjustable elastic tie-down cord typically referred to as a bungee or shock cord.

Tension fasteners are used, for example, for securing covers and various other items to boats, cars, trucks, motorcycles, and the like, for bundling packages, and for tying loose items together. The most common prior art devices include linear elastic cords having hooks bound at each end.

Tie-down stretch or tension cords of the prior art have a number of disadvantages. First, they lack adjustability relative to the tension necessary to accomplish the task. The hooks are permanently attached to each end of a fixed length of elastic rope and the elastic rope in many situations must be stretched excessively thereby applying more pressure to the load than desired and thereby exceeding the stretch limits of the cord.

A number of adjustable tie-down stretch or tension cords have been developed but are complex and expensive in construction and in some instances leave a dangling loose end in the cord which may become entangled, for example in the spokes of a vehicle wheel, or tripped upon.

In addition, the hook design for the tension cords of the prior art do not provide adequate abrasion resistance, are overly subject to breakage, particularly in cold weather, to rust and corrosion and are not sufficiently abrasive resistant.

Also, hook designs for the tension cords of the prior art are shaped such that they are not capable of being hooked into small holes or passages in hard flat surfaces.

It is a principal object of the present invention to provide an adjustable elastic tie-down cord which is devoid of these aforementioned disadvantages.

SUMMARY OF THE INVENTION

The adjustable elastic tie-down cord of the present invention includes an elongated stretchable elastic cord having two end portions with a hook secured to one of the end portions. A line adjusting retainer bar is provided with two spaced passages which pass through the bar and slidably receive different portions of the cord whereby an adjustable loop in the cord is formed on one side of the bar for selectively adjusting the overall length of the cord.

The other end of the cord is provided with a stop, such as a stop knot, for preventing the cord end portion from passing through its respective passage in the line adjusting retainer bar. A hook is slidably received on the cord in the loop section.

Adjustment of the overall length of the cord is accomplished by merely sliding the cord end which is terminated with the hook, in or out of its respective passage through the line adjusting retainer bar to correspondingly adjust the size of the loop. This adjustment is made when the cord is not under tension.

Once the adjustment has been accomplished, and tension is applied to the cord through the respective hooks, the line adjusting retainer bar is forced to turn sideways such that it is substantially in line with or alignment with the cord. The resistance thus applied by the retainer bar to the tensioned elastic cord prevents the cord from further slipping through its passage in the retainer bar and prevents the prealigned adjustment from slipping.

To further assist in preventing the cord from slipping through its passage in the retainer bar, the passage through which the elastic cord normally slides for adjustment is provided with annularly eased edge openings for engagement with the elastic cord, and in addition, sharp protrusions are further provided at points of engagement for penetrating the elastic cord and thereby assisting in locking the elastic cord in position. These eased passage entrances where the protrusions are provided are also preferably provided as concave annular recesses which permits the protrusions to more effectively penetrate the elastic cord and also provides sharp edges to better engage the cord and prevent it from slipping.

The hooks are preferably constructed of stainless steel in order to prevent rusting and corrosion and they are further preferably provided with a thick rubber coating for assisting in the prevention of abrasion and for protection of the metal hooks.

In addition, the hooks are also preferably C-shaped with parallel shank and terminating end portions whereby the hook can be easily hooked into a small hole in a hard flat surface.

In addition, the passages through the line adjusting retainer bar are preferably provided with eased edged openings for thereby assisting in gripping of the cord by the bar while also assisting in prevention of abrasion to the cord.

The line adjusting retainer bar is also preferably wedged shaped whereby thickness of the bar, and of the passage therethrough which receives the stopped end portion of the cord, is thinner than that for the other passage.

This wedge shaped configuration permits the retainer bar to lay flatter and to more sharply engage the cord at an acute angle to assure prevention of slippage of the cord when the cord is applied under tension.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

FIG. 3 is an enlarged plan view of one of the hooks used in the embodiment shown in FIG. 1 with portions of the rubber coating thereon removed for underlying disclosure;

FIG. 4 is an enlarged view in mid cross section of the line adjusting retainer bar and elastic cord combination shown in FIG. 1 as seen along section line IV—IV;

DESCRIPTION OF A PREFERRED EMBODIMENT

Figures 1, 2:
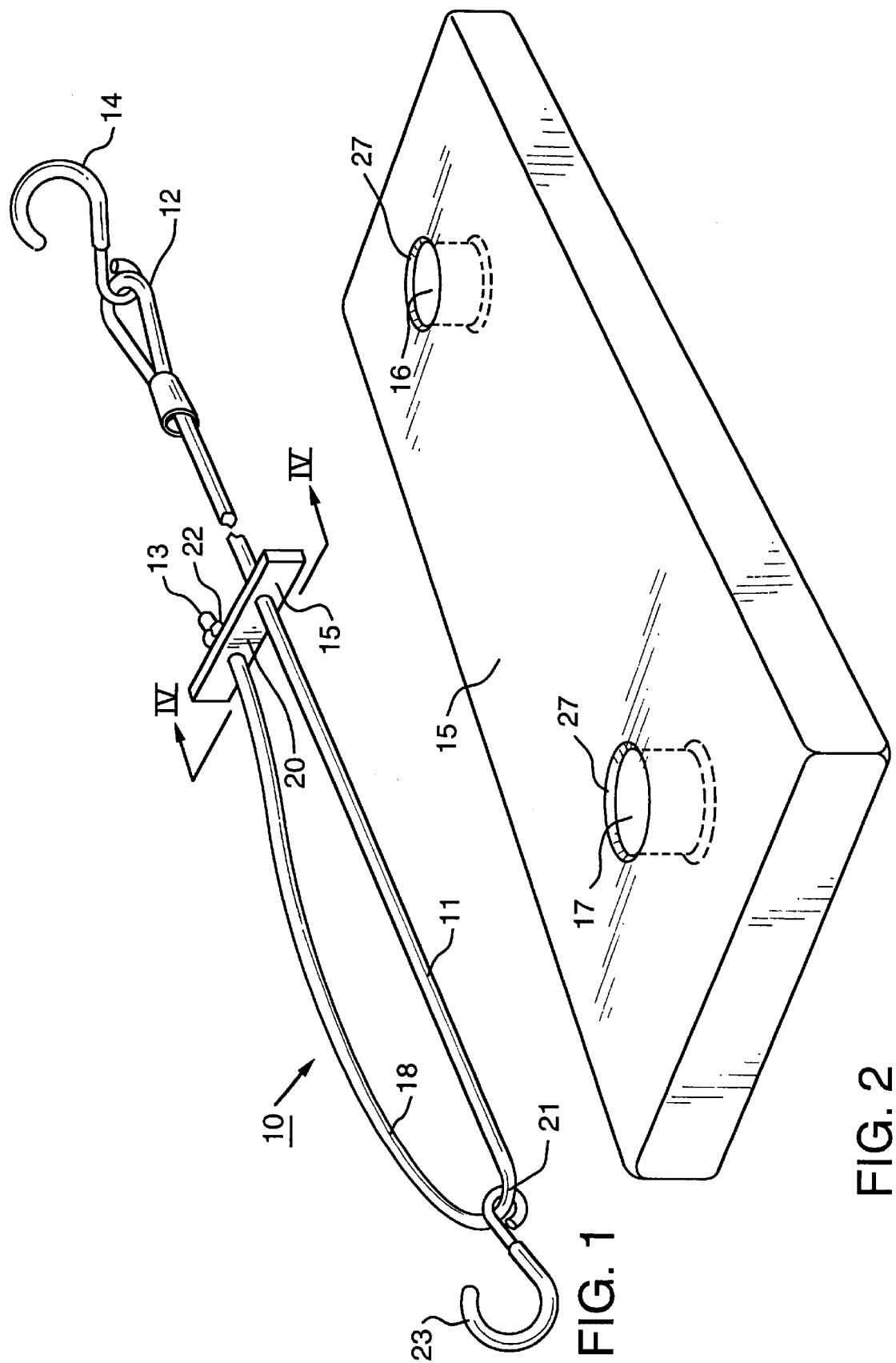
FIG. 1 is a perspective view of the adjustable elastic tie-down cord of the present invention with intermediate portions removed.
FIG. 2 is an enlarged perspective view of the line adjusting retainer bar utilized in the embodiment shown in FIG. 1.

Referring to the drawings, adjustable elastic tie-down cord 10 of the present invention includes an elongated stretchable elastic cord 11 having two end portions 12 and 13 with a hook 14 secured to end portion 12.

Line adjusting retainer bar 15 is provided with two spaced passages 16 and 17 which extend therethrough and which also slidably receive cord 11 therethrough such that an adjustable loop 18 is formed in cord 11 on the one side 20 of bar 15 for selectively adjusting the overall length of cord 11 between hook 14 and the distal end 21 of loop 18.

The other end portion 13 of cord 11 is provided with a stop 22 in the form of a stop knot for preventing the cord end portion 13 from passing back through passage 16 in bar 15. Hook 23 is slidably received on cord 11 in loop 18 to provide hooks 14 and 23 at opposite ends of the adjustable cord 10.

The hooks 14 and 23 are constructed of T-302 stainless steel and a heavy Plastisole (trademark) rubber coating 24 is applied over the hooks to prevent abrasion. The hooks 14 and 23 are C-shaped and their shank portion 25 and terminating end portion 26 are parallel. This open configuration, as previously explained, permits the hook to be hooked into small holes in hard flat surfaces.

In addition, the passages 16 and 17 in line adjusting retainer bar 15 are provided with eased edges 27 in the form of beveled edges for thereby assisting in gripping of the cord 11 by bar 15 while also assisting in prevention of abrasion to the cord where it passes through the respective passages 16 and 17.

The line adjusting retainer bar 15 is also wedged shaped, as is best seen in FIGS. 2 and 4, whereby the thickness of bar 15 at passage 16 is thinner than the thickness of the bar at the position of passage 17. The advantages of this configuration were hereinbefore described.

The adjustable elastic tie-down cord 10 of the present invention is thus constructed and configured such that there are no loose dangling ends or no hooks to rust or abrade and no slippage of the adjustable arrangement provided by retainer bar 15 is assured.

Actual testing of the invention has proven that the adjustment mechanism will not lose its grip even in cold temperatures of below minus 5° F., or above temperatures of 115° F., with approximately 175 pound tension applied to the cord.

Of course, hooks and cords of various size and diameter may be utilized in a variety of lengths. Typical shock cord diameters are from 3/16 of an inch to 1/2 inch in 1/16 inch increments and with extremely varied color configurations.

Figure 5:
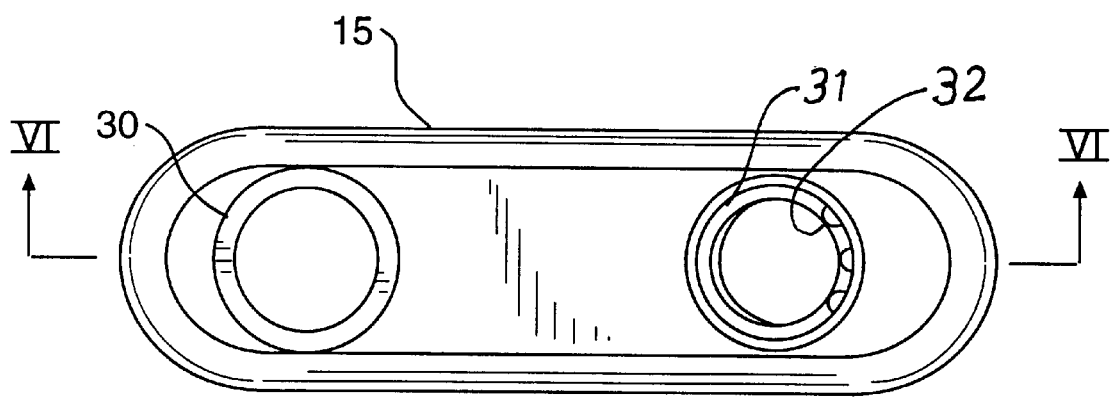
FIG. 5 is an enlarged plan view of an alternative embodiment of the line adjusting retainer bar portion of the adjustable elastic tie-down cord of the present invention.
Figure 6:
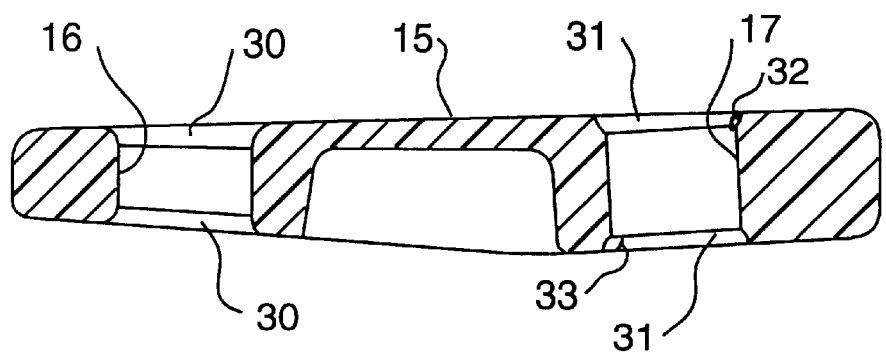
FIG. 6 is a view in side elevation as seen in mid cross section along section line VI—VI of the line adjusting retainer bar of FIG. 5.
Figure 7:
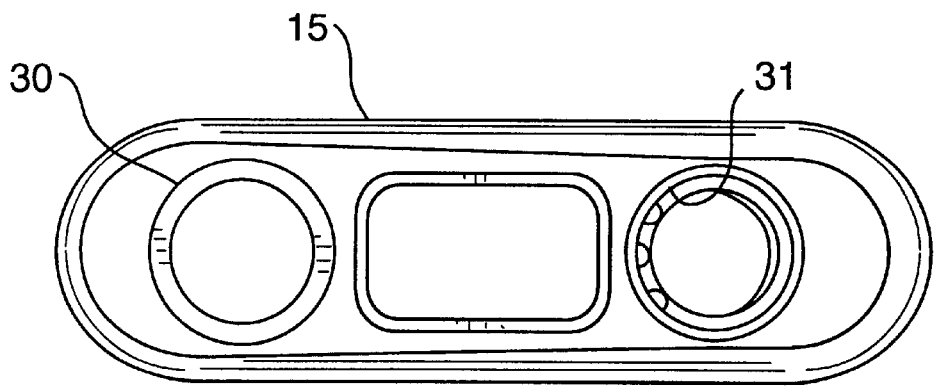
FIG. 7 is a bottom view of the line adjusting retainer bar shown in FIG. 5.

Turning next to FIGS. 5, 6 and 7, an alternative embodiment of the adjusting retainer bar 15 is illustrated. In this instance, the bar is molded of plastic, but is identical in all other respects, including the afore-described wedged shape and with the exception of certain novel features which will be hereinafter described.

In this embodiment, the passage 16 through which the stopped end of the elastic cord will pass is provided with eased annular edges as indicated at 30. These eased edges are annularly convex as opposed to the strictly beveled surfaces 27 of the embodiment illustrated in FIG. 2.

The passage 17 is the passage through which the cord 11 adjustably slides for initial length adjustment and this passage is provided with annularly eased edge openings 31 which are in the form of concave annular recesses for better engaging the elastic cord with its sharp corner edges. In addition, these recesses 31 are further provided with pointed protrusions 32 which are positioned at the points of engagement where the cord will engage the recesses 31 when the apparatus is finally positioned and stretched. These protrusions 32 will penetrate the elastic cord at these points of engagement for thereby assisting in locking the elastic cord in position within passage 17.

I claim:

1. In an adjustable elastic tie-down cord comprising:

an elongated stretchable elastic cord having two end portions with a hook secured to one of said end portions;

a line adjusting retainer bar having two spaced passages therethrough which slidably receive said cord whereby an adjustable loop in said cord is formed on one side of said bar for selectively adjusting the length of said cord;

the other of said cord end portions having a stop thereon for preventing said other cord end portion from passing through one of said passages; and a hook slidably received on said cord in said loop;

the other of said passages having annularly eased edge openings for engagement with said elastic cord and protrusions at this point of engagement for assisting in locking said elastic cord in position in said other passage.

2. The adjustable elastic tie-down cord of claim 1 wherein said eased edge openings are concave annular recesses.

3. The adjustable elastic tie-down cord of claim 2 wherein the said one of said passages has eased edge openings for thereby assisting in gripping of said cord by said bar while also assisting in prevention of abrasion to said cord.

4. The adjustable elastic tie-down cord of claim 2 wherein said line adjusting retainer bar is wedge shaped whereby thickness of said bar and of the said one of said passages therethrough which receives the stopped end portion of the cord is thinner than that for the said other passage.

5. The adjustable elastic tie-down cord of claim 2 wherein said hooks have a rubber coating for assisting in the prevention of abrasion.

6. The adjustable elastic tie-down cord of claim 2 wherein said hooks are circular C-shaped with parallel shank and terminating ends.

7. The adjustable elastic tie-down cord of claim 1 wherein said hooks are stainless steel.

* * * * *